(12) United States Patent
Koch et al.

(10) Patent No.: US 10,843,553 B2
(45) Date of Patent: Nov. 24, 2020

(54) FUEL FEED MODULE WITH INTEGRAL RESISTOR

(71) Applicants: Marcus Koch, Recklinghausen (DE); Ralf Musich, Datteln (DE); Gabriel Simara Lima, Hofheim am Taunus (DE); Marco Valencia, Cd. Juarez (MX)

(72) Inventors: Marcus Koch, Recklinghausen (DE); Ralf Musich, Datteln (DE); Gabriel Simara Lima, Hofheim am Taunus (DE); Marco Valencia, Cd. Juarez (MX)

(73) Assignee: VITESCO TECHNOLOGIES GMBH, Hannover (DE)

( * ) Notice: Subject to any disclaimer, the term of this patent is extended or adjusted under 35 U.S.C. 154(b) by 28 days.

(21) Appl. No.: 15/139,681

(22) Filed: Apr. 27, 2016

(65) Prior Publication Data

US 2016/0312751 A1    Oct. 27, 2016

(30) Foreign Application Priority Data

Apr. 27, 2015  (DE) .................. 10 2015 207 712

(51) Int. Cl.
| | | |
|---|---|---|
| *B60K 15/03* | (2006.01) | |
| *B60K 15/01* | (2006.01) | |
| *F02M 37/10* | (2006.01) | |
| *F02M 37/08* | (2006.01) | |

(52) U.S. Cl.
CPC .............. *B60K 15/03* (2013.01); *B60K 15/01* (2013.01); *F02M 37/10* (2013.01); *B60K 2015/0319* (2013.01); *B60K 2015/03105* (2013.01); *B60K 2015/03111* (2013.01); *B60K 2015/03381* (2013.01); *B60K 2015/03453* (2013.01); *F02M 37/106* (2013.01); *F02M 2037/082* (2013.01); *F02M 2037/085* (2013.01)

(58) Field of Classification Search
CPC .................... B60K 15/01; B60K 15/03; B60K 2015/03105; B60K 2015/03111; B60K 2015/0319; B60K 2015/03381; B60K 2015/03453; F02M 2037/082; F02M 2037/085; F02M 37/10; F02M 37/106
See application file for complete search history.

(56) References Cited

U.S. PATENT DOCUMENTS

| | | | |
|---|---|---|---|
| 5,647,330 A | 7/1997 | Sawert et al. | |
| 2005/0194796 A1* | 9/2005 | Powell ................. | F02M 37/103 292/256 |
| 2006/0266112 A1* | 11/2006 | Crary .................... | G01F 23/363 73/313 |
| 2007/0215115 A1* | 9/2007 | Hazama ................ | F02D 33/003 123/458 |
| 2014/0257670 A1 | 9/2014 | Tsuchiya | |

FOREIGN PATENT DOCUMENTS

| | | |
|---|---|---|
| DE | 1020069015959 B4 | 5/2011 |
| EP | 1074731 | 2/2001 |

* cited by examiner

*Primary Examiner* — Lindsay M Low
*Assistant Examiner* — Ruben Picon-Feliciano
(74) *Attorney, Agent, or Firm* — Cozen O'Connor

(57) ABSTRACT

A fuel feed module for delivering fuel from a fuel tank includes a fuel feed pump and a flange. The fuel feed module is fixable to the fuel tank by the flange. The fuel feed module includes a resistor, which is electrically conductively integrated into a ground path of the fuel feed pump, the resistor being integrated into the flange of the fuel feed module.

9 Claims, 2 Drawing Sheets

FUEL FEED MODULE WITH INTEGRAL RESISTOR

BACKGROUND OF THE INVENTION

1. Field of the Invention

The invention relates to a fuel feed module for delivering fuel from a fuel tank, having a fuel feed pump and a flange, in which the fuel feed module can be fixed to the fuel tank by the flange.

2. Description of the Related Art

Fuel feed pumps in motor vehicles are used to deliver fuel from the fuel tank to the internal combustion engine. For this purpose, the fuel feed pump itself and other electronic components are arranged in the fuel tank and therefore come into direct contact with the fuel. In order to prevent the fuel from igniting, grounding devices are provided, which drain off electrostatic charges from the components.

In addition, electrical resistors are introduced into the ground path of the fuel feed pump to afford greater safety, particularly when a fuel having a high ethanol content is used. The resistor in the ground path furthermore also serves to reduce the formation of a film on the carbon brushes of the electric motor of the fuel feed pump.

Devices are known in the state of the art that provide an electrical resistor directly on or in the fuel feed pump. One particular disadvantage of these devices is that the electrical resistor regularly comes into contact with the fuel and is furthermore exposed to the mechanical stresses caused by the movement of the fuel feed pump. This can cause structural damage to the electrical resistor, leading to possible failure of the electrical resistor. A further disadvantage is that the electrical resistor is exposed to increased corrosion owing to is exposed position on or in the fuel feed pump.

SUMMARY OF THE INVENTION

An object of the present invention, therefore, is to create a feed module that includes an electrical resistor in the ground path of the fuel feed pump, in which the electrical resistor is better protected against the corrosive characteristics of the fuel. It is also intended that the electrical resistor be better protected against mechanical stresses.

An exemplary embodiment of an aspect of the invention relates to a fuel feed module for delivering fuel from a fuel tank, having a fuel feed pump and a flange, wherein the fuel feed module can be fixed to the fuel tank by the flange, wherein the fuel feed module comprises an electrical resistor, which electrically is conductively integrated into a ground path of the fuel feed pump, wherein the electrical resistor is integrated into the flange of the fuel feed module.

The electrical resistor is hereinafter referred to simply as a resistor. This thereby always signifies an electrical resistor which may preferably be formed by an ohmic resistance.

The fuel feed module (device) is a structural unit, which can be used for delivering fuel into an opening of the fuel tank. The flange for this purpose forms the connecting piece, by which the fuel feed module can be fixed to the surrounding edges of the opening of the fuel tank. Besides the flange and the fuel feed pump the fuel feed module may also comprise a fuel pot, which forms a reservoir, from which the fuel feed pump is able to deliver the fuel.

To prevent sparking, the fuel feed pump, other electrical components and electrically conductive elements have an electrically conductive interconnection via a so-called ground path. The ground path is ultimately connected to an element at ground potential.

In particular, a resistor is preferably provided in the ground path of the fuel feed pump in order to reduce or entirely prevent the formation of films on the carbon brushes of the electric motor. The ground path having the resistor can therefore preferably be connected to the housing of the fuel feed pump, the housing of the electric motor arranged in the fuel feed pump or to individual electrically conductive components of the fuel feed pump.

The resistor is preferably arranged such that it is not damaged either by the mechanical shocks produced in operation or by the corrosive characteristics of the fuel, and in particular of a pure ethanol fuel. This is intended to prevent not only structural damage to the resistor but also to prevent an increase or reduction in the resistance. Any variation in the resistance over the entire service life should preferably be less than one milliohm.

An arrangement of the resistor in the flange is especially preferable for this purpose, since it is possible to achieve both a mechanical isolation and a fluid separation from the fuel. The mechanical isolation is achieved in that oscillations of the fuel feed pump are isolated from the flange by spring elements. Special holders may also be provided in the fuel pot, which help to isolate the oscillations of the fuel feed pump from the rest of the fuel feed module.

It is especially advantageous if the resistor is completely imperviously encased by the material of the flange. This is advantageous in isolating the resistor from the fuel. The corrosive influences of the fuel on the resistor are thereby minimized.

It is also advantageous if the resistor is overmolded with plastic material, wherein the resistor can be electrically connected via contacts passing through the plastic material. Plastic material is particularly advantageous, since it is easy to produce and can be molded in a virtually unlimited variety of shapes. At the same time plastic materials are highly resistant to the corrosive characteristics of the fuel.

A preferred exemplary embodiment is characterized in that the flange is a plastic injection molded part, wherein the resistor is overmolded with the material of the flange. This is particularly advantageous, since the resistor can be integrated into the flange in one operation when producing the flange. For this purpose, the flange may be positioned in an injection mold, for example, which is then filled with a suitable plastic material in order to produce the flange.

It is also preferable if the flange has at least two electrical contact elements on one outer face, wherein the contact elements have an electrically conductive interconnection via the resistor.

Contact elements are particularly advantageous in producing an electrically conductive connection to the resistor. One of the contact elements is preferably embodied as an input lead to the resistor and one of the contact elements as an output lead from the resistor. The resistor can therefore easily be connected to the chassis ground of the motor vehicle and to the fuel feed pump.

In addition, it is advantageous if the resistor is held in an electrically conductive mounting device, wherein the mounting device has contacts for electrical connection of the mounting device. The mounting device may be formed, in particular, by an electrically conductive frame, which both accommodates the resistor and allows electrical connection to the fuel feed pump and to the chassis ground of the motor vehicle. The contacts may be standardized plug connector contacts, for example, or areas that may be connected by soldered contacts.

It is furthermore advantageous if the mounting device is at least partially encased by an electrically insulating material, wherein the resistor is encased by the electrically insulating material. The mounting device may include a housing, which preferably encapsulates the resistor. This serves, on the one hand, to protect the resistor from mechanical stresses and, on the other hand, for electrical insulation.

It is also useful if the mounting device comprises at least two contact elements bent outwards from one plane, wherein the contact elements have an electrically conductive interconnection via the resistor. The contact elements are advantageous in facilitating the establishment of an electrically conductive connection between the fuel feed pump, the resistor and the chassis ground of the motor vehicle.

In addition, it is advantageous if the mounting device is formed from an electrically conductive material and the contact elements have an electrically conductive interconnection by means of the resistor. This is advantageous in facilitating the production of an electrically conductive connection to the resistor and in improving the electrical connection of the ground path to the chassis ground of the motor vehicle.

The mounting device is furthermore suitably integrated into the flange together with the resistor, wherein the mounting device and the resistor are imperviously overmolded with the material of the flange. This is advantageous in achieving a mechanical isolation of the resistor. The resistor is additionally protected by the arrangement on the mounting device. Overmolding the mounting device also serves to isolate the resistor from the fuel.

The mounting device together with the resistor is also suitably at least partially overmolded by a housing, wherein the housing is arranged on an outer face of the flange and connected to the flange. The housing of the mounting device may, in particular, comprise catch elements, which correspond to catch elements on the flange, in such a way that a fixed connection can be produced between the housing and the flange.

In an alternative development the mounting device may also be fixed between a separate housing and the flange by connecting the housing to the flange and thereby locking the mounting device to the resistor between the flange and the housing. At least one of the contact elements here passes outwards through the housing, while at least a second contact element passes inwards through the flange, in order to afford an electrical connection to the fuel feed pump.

It is also preferable for the flange to be connected to a fuel pot by spring elements, which serve to pretension the fuel pot between the flange and a fuel tank, wherein the fuel feed pump is arranged inside the fuel pot and the fuel feed pump has an electrically conductive connection to the resistor integrated in the flange.

Such a design of the fuel feed module is advantageous in ensuring a sufficient delivery of fuel at any time irrespective of the filling level in the fuel tank. The fuel pot forms a reservoir, in which the fuel feed pump is arranged. The fuel from the fuel tank is delivered from this reservoir. Pretensioning between the flange and fuel pot achieves a more secure fixing of the fuel pot.

Advantageous developments of the present invention are described in the dependent claims and in the following description of the figures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in detail below with reference to an exemplary embodiment, referring to the drawings. In the drawings.

DETAILED DESCRIPTION OF THE PRESENTLY PREFERRED EMBODIMENTS

Figure 1:
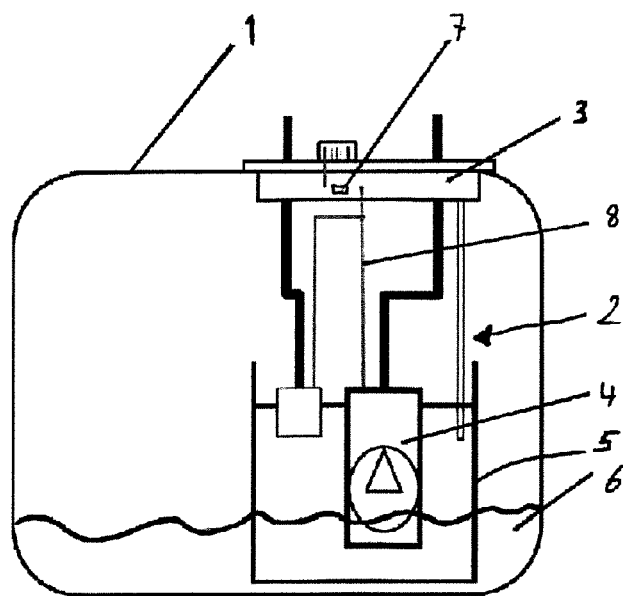
FIG. 1 shows a diagrammatic sectional view through a fuel tank having an integral fuel feed module.

FIG. 1 shows a sectional view through a fuel tank 1. A fuel feed module 2 is inserted into the fuel tank 1 through an opening in the fuel tank 1. At its upper end the fuel feed module 2 has a flange 3, via which the fuel feed module 2 is attached to the fuel tank 1. The fuel feed module 2 further comprises a fuel feed pump 4, which is arranged in a fuel pot 5.

The fuel tank 1 is filled with fuel 6, which can be delivered from the fuel tank 1 by the fuel feed pump 4. The fuel pot 5 is connected by spring elements (not shown further) to the flange 3, so that the fuel pot 5 is fixed under spring tension between the flange 3 and the base area of the fuel tank 1.

The fuel feed pump 4 has an electrically conductive connection to a resistor 7, which is arranged in the flange 3 of the fuel feed module 2. The resistor 7 is preferably integrated in one piece into the flange 3. In the exemplary embodiment in FIG. 1 the resistor 7 is integrally formed with the flange 3 by overmolding the resistor 7 with the material of the flange 3. The resistor 7 here is already integrated into the flange 3 during manufacture of the flange 3.

The resistor 7 is connected to the fuel feed pump 4 by electrical leads 8 and contacts. FIG. 1 does not show the further connection of the resistor to the chassis ground of the motor vehicle (likewise not shown), in order to achieve grounding of the fuel feed pump 4. In addition, further electrical elements or electrically conductive components may also be connected to the resistor 7, in order to ground these also.

Figure 2:
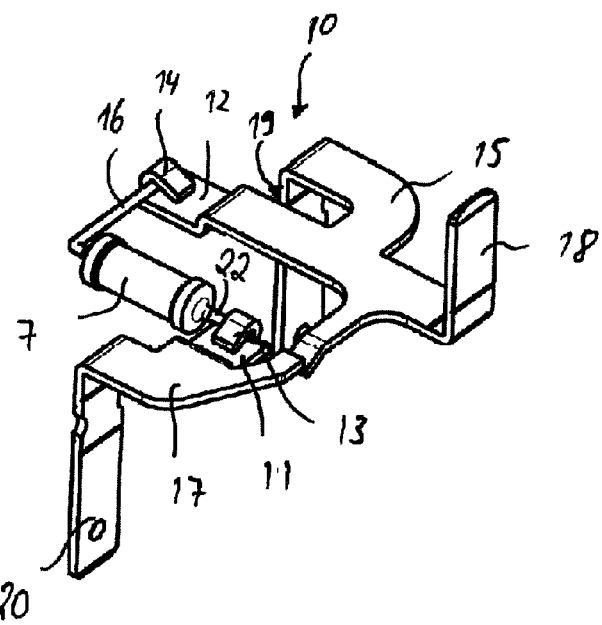
FIG. 2 shows a perspective view of the mounting device with a resistor.

FIG. 2 shows a mounting device 10, which is formed from an electrically conductive material. In the exemplary embodiment in FIG. 2, the mounting device 10 is formed from a blanked sheet-metal component of bent shape. The mounting device 10 has attachment points 11, 12 for the resistor 7. In FIG. 2 these attachment points are formed by lugs 13, 14, which are produced from the material of the mounting device 10 by bending.

The mounting device 10 is preferably of two-part design, such that one of the portions 15 has an electrically conductive connection to a first contact 16 of the resistor 7 and the second portion 17 has an electrically conductive connection to the second connect contact 22 of the resistor 7. The attachment of one of the portions 15, 17 to the chassis ground of the motor vehicle and the attachment of the other corresponding portion 15, 17 to the fuel feed pump is a simple way of grounding the fuel feed pump.

The mounting device 10 has contact elements 18, 19 and 20, which are bent out of the main plane of the mounting device 10. By way of these contact elements 18, 19 and 20 an electrically conductive connection can be produced between the resistor 7 and the chassis ground of the motor vehicle and the fuel feed pump. For this purpose, connectors can be pushed onto the contact elements 18, 19 and 20 or soldered connections can be produced on the contact elements 18, 19 and 20.

Figure 3:
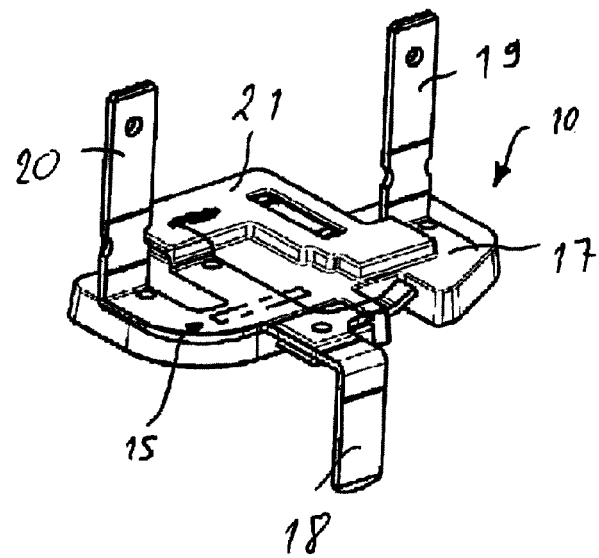
FIG. 3 shows a perspective view of the mounting device, rotated in relation to FIG. 1, wherein a part of the mounting device is overmolded with a plastic material.

FIG. 3 shows an alternative view of the mounting device 10, wherein a part of the mounting device 10 is enclosed by a housing 21. The housing 21 may be molded around the mounting device 10 by an injection molding process. The housing 21 is preferably formed from an electrically non-conductive material and on the one hand constitutes an electrical insulation of the resistor, while on the other hand also protecting the resistor from mechanical interference. This also includes interference, which may occur particularly during the manufacture of the mounting device and the flange. This also covers transport and storage of the mounting devices together with the resistors.

The housing 21 is furthermore formed such that the two portions 15, 17 of the mounting device 10 are stabilized in relation to one another and furthermore such that they have an electrically conductive interconnection only via the resistor.

The contact elements 18, 19 and 20 protrude from the housing 21 and furthermore allow electrical connection of the mounting device 10. The mounting device 10 may be completely enclosed except for the contact elements 18, 19 and 20, or only partially enclosed.

Figure 4:
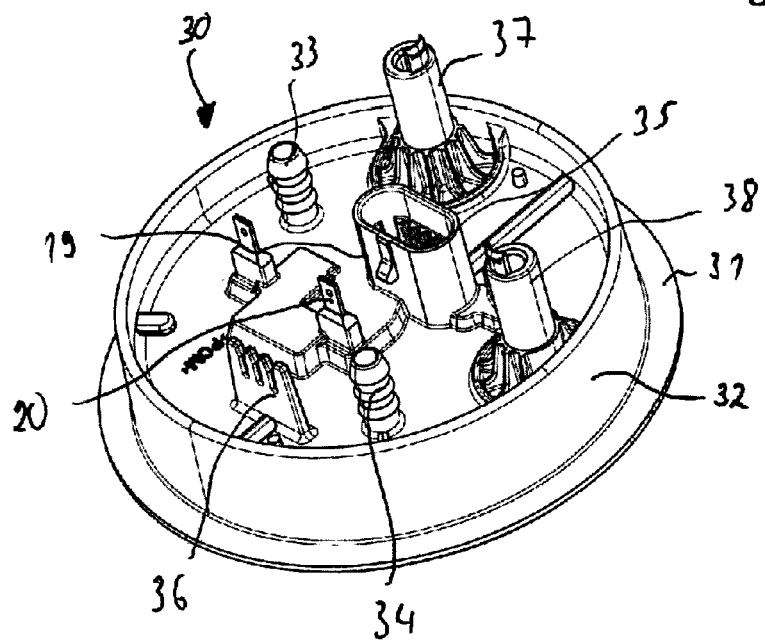
FIG. 4 shows a perspective view of a flange, wherein the mounting device in FIG. 2 is integrally molded into the flange and two contact elements protrude from the flange.

FIG. 4 shows a perspective view of a flange 30. The flange 30 comprises a circumferential flange area 31, by which the flange 30 can be fixed to a wall of a fuel tank. Adjoining the circumferential flange area 31 is an annular area 32. In the finally assembled state this area 32 protrudes from the fuel tank.

A plurality of elements, which serve for connecting the fuel feed module to various elements, are arranged on the upward facing outer surface of the flange 30. The fittings 33 and 34 are connection fittings for fluid lines, such as fuel lines, for example.

A connector can be inserted into the socket 35 for electrical connection of the components situated in the fuel tank. In particular, signals between control units and the fuel feed pump or sensors in the fuel tank can be transmitted via an inserted connector.

The comb-like structure 36 guides and stabilizes cables that run on the flange 30. The fittings 37 and 38 fix axes with spring elements, which can be used in to fix the fuel pot arranged inside the fuel tank in relation to the inside wall of the fuel tank and the flange under spring tension.

The contact elements 19 and 20 can also be seen on the flange 30. The mounting device 10 including the resistor 7 is integrated into the flange 30. The mounting device 10 is, in particular, overmolded by the material of the flange 30. The contact elements 19, 20 protrude from the flange 30, to allow contact with the chassis ground of the motor vehicle and to be able to make an electrically conductive connection to the fuel feed pump. The contact elements 19, 20 protrude from pedestal-like elevations on the flange 30 and each have a through-hole at their free end areas.

The flange 30 is preferably integrally formed as an injection molded part, wherein the mounting device 10 including the resistor is molded into the flange 30. Differing manufactured forms are also feasible, provided that the resistor is wholly integrated into the flange, so as to afford an impervious isolation from the fuel in the fuel tank and to ensure isolation from the oscillations of the fuel feed pump.

The various features of the individual exemplary embodiments may also be combined with one another. The exemplary embodiments in FIGS. 1 to 4 are by way of example and in particular do not have any restrictive character. They serve to illustrate the idea of the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fuel feed module (2) for delivering fuel from a fuel tank (1) having an opening at an upper end thereof, the fuel feed module (2) comprising:
   a fuel feed pump (4);
   a resistor (7) electrically conductively integrated into a ground path of the fuel feed pump (4), the resistor having a first contact (16) protruding directly from a first end of the resistor (7) and a second contact (22) protruding directly from a second end of the resistor (7);
   an electrically conductive mounting device (10), the resistor (7) being arranged in the mounting device (10), the mounting device (10) having:
      a first portion (15) electrically conductively connected to the first contact (16) of the resistor (7),
      a second portion (17) electrically conductively connected to the second contact (22) of the resistor (7), and
      contact elements (18, 19, 20) configured to electrically connect the resistor (7) to a chassis ground via the ground path; and
   a flange (3, 30) that attaches the fuel feed module (2) to the opening at the upper end of the fuel tank (1), the flange having the mounting device (10) and the resistor (7) integrated therein,
   wherein the flange (3, 30) comprises a plastic injection molded part, and wherein the resistor (7) is encased within the plastic injection molded part of the flange (3, 30).

2. The fuel feed module (2) as claimed in claim 1, wherein the flange (3, 30) comprises a material configured and arranged so as to imperviously encase the resistor (7).

3. The fuel feed module (2) as claimed in claim 1, the fuel feed module (2) further comprising contacts (18, 19, 20) that pass through the plastic injection molded part, the resistor (7) being electrically connectable via the contacts (18, 19, 20).

4. The fuel feed module (2) as claimed in claim 1, wherein the flange (3, 30) has at least two electrical contact elements (19, 20) on one outer face of the flange (3, 30), the at least two contact elements (19, 20) being electrically conductively interconnected by the resistor (7).

5. The fuel feed module (2) as claimed in claim 1, wherein the mounting device (10) is partially encased by an electrically insulating material, the resistor (7) being entirely encased by the electrically insulating material.

6. The fuel feed module (2) as claimed in claim 1, wherein the contact elements (18, 19, 20) are each bent outwards from a first plane, and wherein the contact elements (18, 19, 20) are electrically conductively interconnected by the resistor (7).

7. The fuel feed module (2) as claimed in claim 1, wherein the mounting device (10) comprises an electrically conductive material, and wherein the contact elements (18, 19, 20) are electrically conductively interconnected by the resistor (7).

8. The fuel feed module (2) as claimed in claim 1, wherein the mounting device (10) and the resistor (7) are together integrated into the flange (3, 30), and wherein the mounting device (10) and the resistor (7) are imperviously encased within material of the flange (3, 30).

9. The fuel feed module (2) as claimed in claim 1, further comprising a housing (21) arranged on an outer face of the flange (3, 30) and connected to the flange (3, 30), wherein the mounting device (10) and the resistor (7) are together at least partially encased by the housing (21).

* * * * *